(12) United States Patent
Kido

(10) Patent No.: US 9,385,806 B2
(45) Date of Patent: Jul. 5, 2016

(54) VISIBLE LIGHT COMMUNICATION DEVICE

(71) Applicant: Panasonic Corporation, Osaka (JP)

(72) Inventor: Shojirou Kido, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 207 days.

(21) Appl. No.: 14/094,024

(22) Filed: Dec. 2, 2013

(65) Prior Publication Data

US 2014/0159586 A1    Jun. 12, 2014

(30) Foreign Application Priority Data

Dec. 11, 2012   (JP) ................................. 2012-270566
Aug. 2, 2013    (JP) ................................. 2013-161018

(51) Int. Cl.
| | | |
|---|---|---|
| *H04B 10/11* | (2013.01) | |
| *H04B 10/116* | (2013.01) | |
| *H05B 33/08* | (2006.01) | |
| *H05B 37/02* | (2006.01) | |

(52) U.S. Cl.
CPC .......... *H04B 10/116* (2013.01); *H05B 33/0845* (2013.01); *H05B 37/0272* (2013.01)

(58) Field of Classification Search
CPC ............. H04B 10/116; H05B 33/0845; H05B 37/0272
See application file for complete search history.

(56) References Cited

U.S. PATENT DOCUMENTS

| | | | |
|---|---|---|---|
| 2011/0221350 A1 | 9/2011 | Staab | |
| 2012/0051757 A1* | 3/2012 | Nishino | H04B 10/1149 398/201 |
| 2012/0081009 A1 | 4/2012 | Shteynberg et al. | |
| 2013/0015785 A1* | 1/2013 | Kamada | H04B 10/116 315/297 |

FOREIGN PATENT DOCUMENTS

| | | |
|---|---|---|
| EP | 2 547 174 A2 | 1/2013 |
| JP | 2005-217330 A | 8/2005 |
| JP | 2008-235530 A | 10/2008 |
| JP | 2012-69505 A | 4/2012 |
| JP | 2012-133971 A | 7/2012 |

OTHER PUBLICATIONS

European Search Report, corresponding EP application 13193994.4, dated Mar. 12, 2014.

\* cited by examiner

*Primary Examiner* — Jung Kim
(74) *Attorney, Agent, or Firm* — Renner, Otto, Boisselle & Sklar, LLP

(57) ABSTRACT

A variable impedance circuit (2) has an impedance device and is connected in series with a light source (A1). A switch circuit (Q1) is connected in parallel with the variable impedance circuit (2). A first controller (3) is configured to perform ON and OFF control of the switch circuit (Q1) and thereby to modulate an intensity of an illumination light emitted from the light source (A1). An impedance-varying circuit (Q2) is connected with the variable impedance circuit (2). The second controller (4) is configured to control the impedance-varying circuit (Q2) to change the impedance of the variable impedance circuit (2). The first controller (3) and the second controller (4) share a common hardware.

8 Claims, 11 Drawing Sheets

VISIBLE LIGHT COMMUNICATION DEVICE

TECHNICAL FIELD

The invention relates to a visible light communication device.

BACKGROUND ART

Conventionally there is proposed an illuminating light communication device which is adapted for a lighting fixture having a light-emitting diode(s) (an LED(s)) as a light source and configured to modulate an intensity of an illumination light to transmit a signal (see Japanese Patent Application Publication Number 2012-69505 (hereinafter referred to as "Document 1") for example). In the illuminating light communication device, no special device such as an infrared communication device is required, because the illumination light per se is modulated and thereby the signal is transmitted. In addition, electric power can be saved by employing the light-emitting diode(s) as a lighting source, and accordingly the usage thereof for a ubiquitous information system in underground malls has been studied.

The illuminating light communication device described in Document 1 includes a constant current source, a smoothing capacitor, a load circuit, a load change element, a signal generation circuit and a switch element. The smoothing capacitor is adapted to reduce the ripple of an output of the constant current source. The load circuit includes light-emitting diodes and is supplied with the output of the constant current source. The load change element is formed of a resistor connected in parallel with a part of the light-emitting diodes, and adapted to be added to the load circuit, thereby partially changing a load characteristic (an impedance characteristic) of the load circuit. The signal generation circuit is configured to generate a binary optical communication signal. The switch element is formed of a switching device connected in series with the resistor as the load change element, and turned on and off in accordance with the optical communication signal, thereby switching whether to add the load change element to the load circuit or not. As a result, a load current flowing through the light-emitting diodes is modulated into a current having waveform corresponding to the optical communication signal, because the load characteristic of the load circuit varies according to the optical communication signal.

There is however a problem in the prior art that a modulation rate (or factor) cannot be changed easily, because the resistor as the load change element consists of a fixed resistor. For example, when a lighting system is installed in a new building, a design change of illumination thereof may be made during the installation of the lighting system. In this case, if the prior art is employed as the lighting system, the resistor needs to be exchanged in accordance with a required modulation rate. As a result, the modulation rate cannot be easily changed.

SUMMARY OF INVENTION

The present invention has been achieved in view of the above circumstances, and an object thereof is to provide a visible light communication device capable of easily changing a modulation rate.

A visible light communication device of the present invention comprises a variable impedance circuit (2), a switch circuit (Q1), a first controller (3), an impedance-varying circuit (Q2) and a second controller (4). The variable impedance circuit (2) has an impedance device (20) and is connected in series with a light source (A1) comprising a light-emitting device (LD1). The switch circuit (Q1) is connected in parallel with the variable impedance circuit (2) and is configured to switch whether to connect the variable impedance circuit (2) to the light source (A1) or not. The first controller (3) is configured to perform ON and OFF control of the switch circuit (Q1) and thereby to modulate an intensity of an illumination light emitted from the light source (A1) to superpose a binary communication signal on the illumination light. The impedance-varying circuit (Q2) is connected with the variable impedance circuit (2), and configured to change an impedance of the variable impedance circuit (2). The second controller (4) is configured to control the impedance-varying circuit (Q2) to change the impedance of the variable impedance circuit (2). The first controller (3) and the second controller (4) share a common hardware.

In an embodiment, the visible light communication device comprises a voltage measuring unit (9) configured to measure a voltage applied across the light source (A1). The second controller (4) is configured to change the impedance of the variable impedance circuit (2) based on a measurement result by the voltage measuring unit (9).

In an embodiment, the visible light communication device comprises a voltage measuring unit (9) configured to measure a voltage applied across the light source (A1) and a current measuring unit (15) configured to measure a current flowing through the light source (A1). The second controller (4) is configured to change the impedance of the variable impedance circuit (2) based on a comparison result between one or more thresholds corresponding to a measurement result by the current measuring unit (15) and a measurement result by the voltage measuring unit (9).

In an embodiment, the visible light communication device comprises a light sensor (10) configured to detect an ambient light. The second controller (4) is configured to change the impedance of the variable impedance circuit (2) based on a detection result by the light sensor (10).

In an embodiment, the impedance device (20) is formed of a body diode of a MOSFET.

In an embodiment, the impedance device (20) is formed of a bipolar transistor.

In the present invention, an impedance of the variable impedance circuit is changed through the second controller and it is thereby possible to easily change a load current flowing through the light source while superposing a communication signal on an illumination light emitted from the light source. Therefore, the invention can easily change a modulation rate.

BRIEF DESCRIPTION OF DRAWINGS

Preferred embodiments of the invention will now be described in further details. Other features and advantages of the present invention will become better understood with regard to the following detailed description and accompanying drawings where.

DESCRIPTION OF EMBODIMENTS (Embodiment 1)

Figure 1:
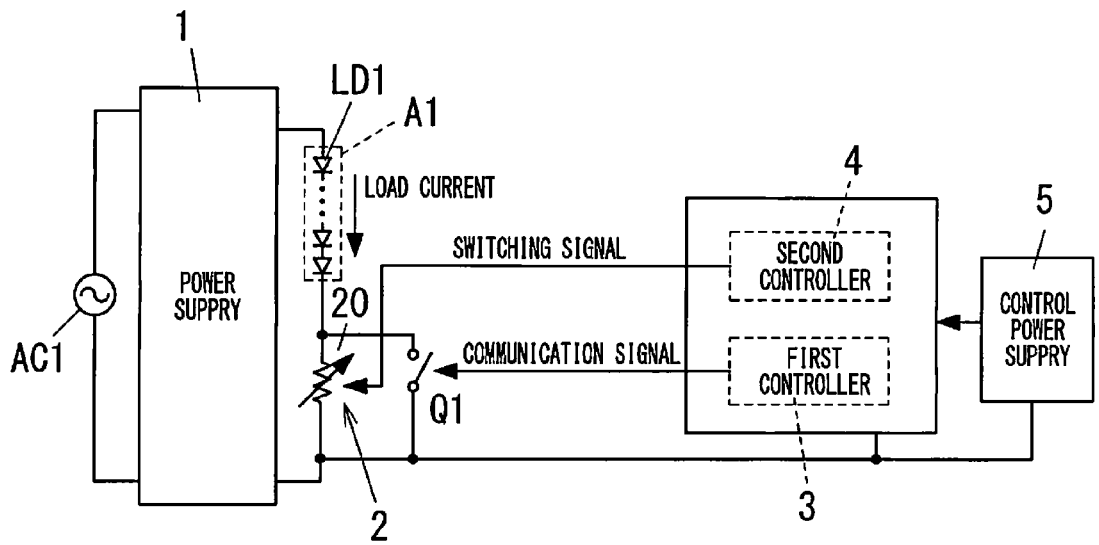
FIG. 1 is a block diagram of a visible light communication device in accordance with an embodiment 1 of the present invention.
Figure 3:
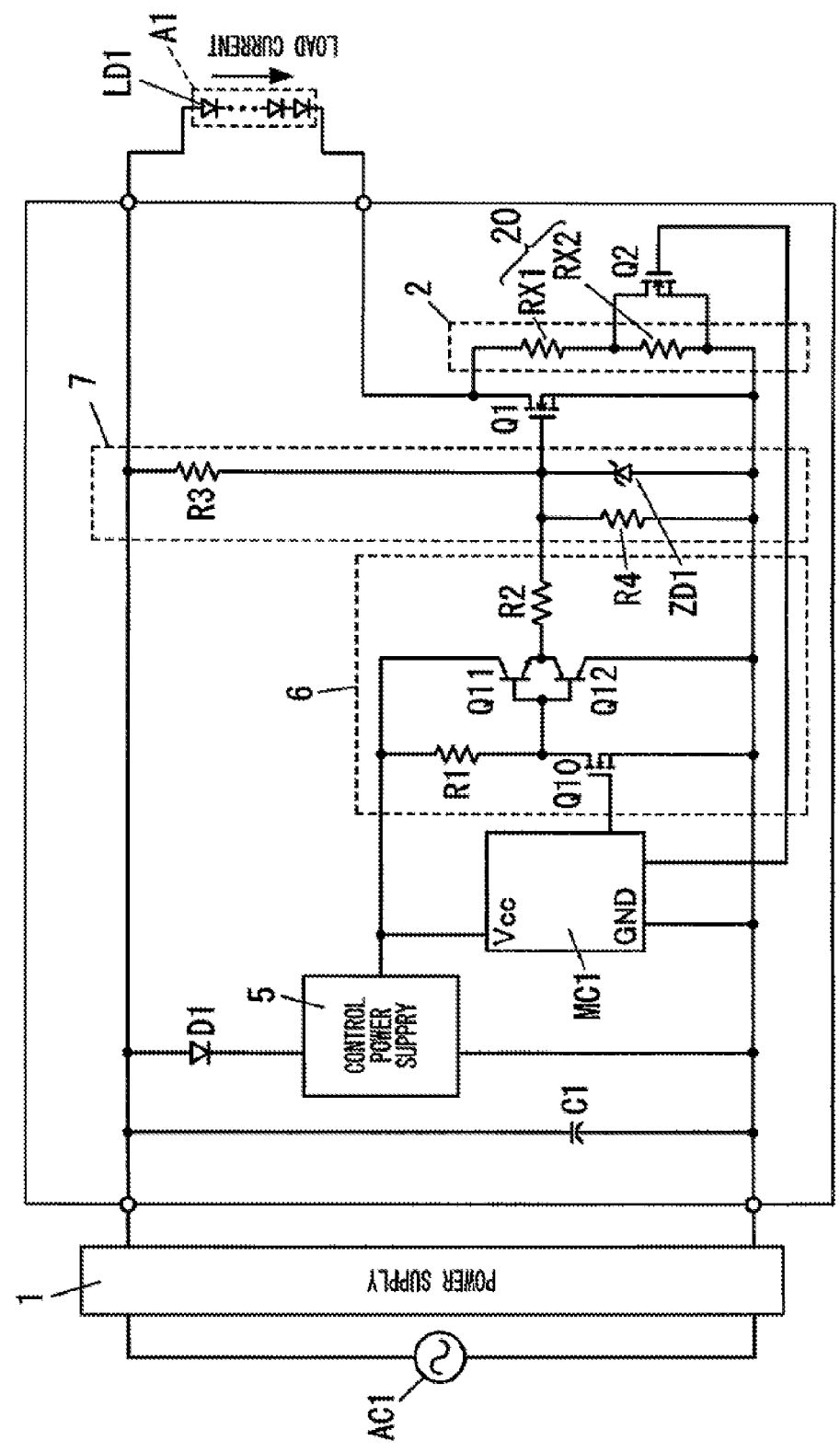
FIG. 3 is a schematic circuit diagram of the visible light communication device in the embodiment 1.

Hereafter a visible light communication device in accordance with an embodiment 1 of the present invention is described with reference to figures. In the embodiment, as shown in FIGS. 1 and 3, the visible light communication device is connected between a power supply 1 and a light source A1, and includes a variable impedance circuit 2, a switching device Q1, a switching device Q2, a first controller 3 and a second controller 4.

The power supply 1 is, for example, a constant current source for supplying a constant load current to the light source A1. The power supply 1 is formed of, for example, a switching power supply including a PFC (power factor correction) circuit and a step-down converter circuit, and is configured to convert an AC current supplied from a commercial power supply AC1 into a DC current to output the DC current. In an example of FIG. 3, a smoothing capacitor C1 is connected in parallel with an output of the power supply 1, or is connected between output ends of the power supply 1. By this smoothing capacitor C1, it is possible to reduce the ripple of a DC current supplied from the power supply 1.

The light source A1 includes a light-emitting diode LD1 or light-emitting diodes LD1 which are connected in series with each other. However, the configuration of the light source A1 is not limited to this. For example, it may be a configuration that series circuits, each of which is a series circuit of light-emitting diodes LD1, are connected in parallel with each other. In the embodiment, a light-emitting device(s) of the light source A1 is(are) a light-emitting diode(s) LD1, but not limited to this. For example, the light-emitting device(s) may be other light-emitting device(s) such as an organic EL device (s), a semiconductor laser(s) or the like.

The variable impedance circuit 2 has an impedance device 20 such as, for example, a resistor(s) or the like, and is connected in series with the light source A1. In the embodiment, as shown in FIG. 3, the variable impedance circuit 2 is formed of a series circuit of a resistor RX1 and a resistor RX2, constituting the impedance device 20. The switching device Q2 (the impedance-varying(changing) circuit) is an n-channel MOSFET for example, and connected in parallel with the resistor RX2. The impedance-varying circuit is configured so that a gate of the switching device Q2 receives a binary switching signal from the second controller 4.

The switching device Q1 (a switch circuit) is an n-channel MOSFET for example, and configured so that a gate of the n-channel MOSFET receives a communication signal from the first controller 3. In the example of FIG. 3, the switching device Q1 is connected in parallel with the variable impedance circuit 2. A load current therefore flows through the light source A1 without flowing through the variable impedance circuit 2 when the switching device Q1 is turned on. On the other hand, when the switching device Q1 is turned off, a load current flows through the light source A1 via the variable impedance circuit 2.

The switching device Q2 (the impedance-varying circuit) is turned on when receiving a switching signal of HIGH level, and turned off when receiving a switching signal of LOW level. When the switching device Q2 is turned off, an impedance of the variable impedance circuit 2 has a combined resistance (value) of the resistor RX1 and the resistor RX2. On the other hand, when the switching device Q2 is turned on, the impedance of the variable impedance circuit 2 has a resistance (value) of the resistor RX1. In short, it is possible to change the impedance of the variable impedance circuit 2 by turning on or off the switching device Q2.

As shown in FIG. 3, the first controller 3 and the second controller 4 are formed of, as a main component, a microcontroller MC1 (hereinafter also referred to as a "CPU") having a built-in memory storing various programs. The CPU executes the programs stored in the memory, thereby realizing functions as stated below. The microcontroller MC1 is activated by a control voltage supplied from a control power supply 5.

The control power supply 5 is formed of, for example, a DC/DC convertor and configured to convert a voltage supplied from the power supply 1 via a diode D1 into a control voltage of 5V to output the control voltage (see FIG. 3).

As shown in FIG. 1, the first controller 3 is configured to supply a binary communication signal to the switching device Q1. The communication signal is obtained by binarizing information such as, for example, position information on indoor lighting fixtures, apparatus information like product codes of lighting fixtures, or the like. A user can utilize information of the communication signal by receiving an illumination light, on which the communication signal is superposed, through a receive-terminal (e.g., a mobile phone or the like) of the user. The CPU (the first controller 3) is configured to supply a communication signal to the switching device Q1 through a high frequency driving circuit 6 and an auxiliary circuit 7.

Figure 2:
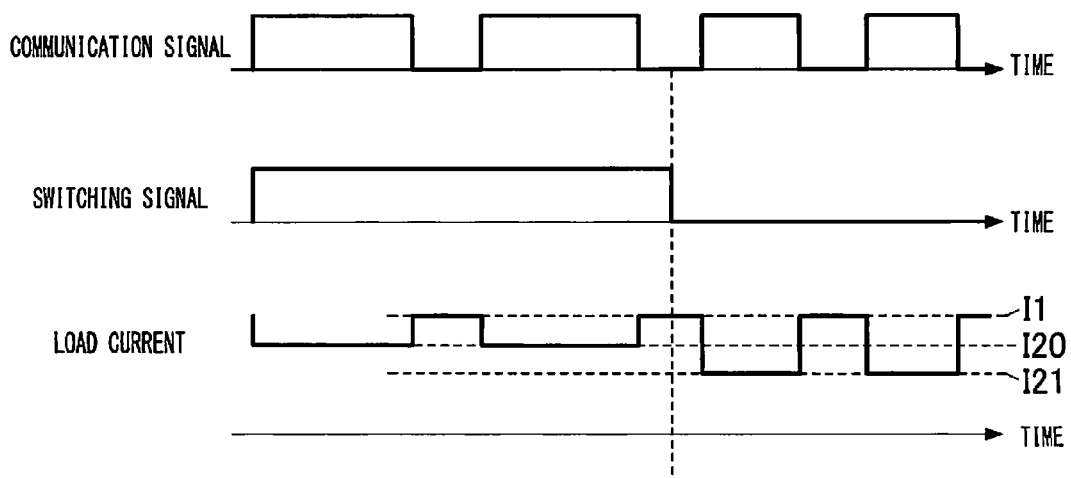
FIG. 2 is a timing diagram showing an operation example of a visible light communication in the embodiment 1.

As shown in FIG. 2, the second controller 4 is configured to supply a binary switching signal to the switching device Q2. Levels of the switching signal can be stored in the memory of the microcontroller MC1 by operating, for example, a console as an operation unit (not shown) in the embodiment. It is therefore possible to change the levels of the switching signal by operating the console when the configuration of the light source A1 has been decided.

In a configuration example, the levels of the switching signal may be changed through a wireless terminal (not shown) such as a remote control unit or the like. In the configuration, a modulation rate (or factor) can be changed without directly operating the console, and therefore the convenience can be improved.

In the example of FIG. 3, the high frequency driving circuit 6 is formed of switching devices Q10-Q12 and resistors R1 and R2. The switching device Q10 is an n-channel MOSFET, and configured so that a gate of the n-channel MOSFET receives a binary communication signal from the first controller 3. A drain of the switching device Q10 is connected to the control power supply 5 via the resistor R1. The switching device Q11 and the switching device Q12 are an NPN transistor and a PNP transistor, respectively. The switching devices Q11 and Q12 constitute a push-pull circuit. Bases of the switching devices Q11 and Q12 are connected to a junction of the resistor R1 and the drain of the switching device Q10. A collector of the switching device Q11 is connected to the control power supply 5, and a collector of the switching device Q12 is connected to Ground (GND). Emitters of the switching devices Q11 and Q12 are connected to the switching device Q1 via the resistor R2.

In the example of FIG. 3, the auxiliary circuit 7 is formed of a series circuit of resistors R3 and R4, and a Zener diode ZD1 connected in parallel with the resistor R4. The auxiliary circuit 7 is connected in parallel with the power supply 1. A gate of the switching device Q1 is connected to a junction of the resistor R3 and the Zener diode ZD1. By providing the auxiliary circuit 7, the switching device Q1 can be forcibly turned on even when the microcontroller MC1 is not activated for example. As a result, it is possible to prevent a load current from continuously flowing through the variable impedance circuit 2 to prevent a light output of the light source A1 from decreasing.

Hereafter an operation of the visible light communication in the embodiment is explained. In the embodiment, the visible light communication is performed by modulating a light intensity of the light source A1 by a communication signal. The SC-4PPM is employed as a modulation method in the visible light communication. According to the 4PPM (4 Pulse Position Modulation), 2 bit data can be transmitted by dividing a fixed time defined as a symbol time into four slots to put a pulse in any one slot of the four slots. Specifically see CP-1221 and CP-1222 of JEITA (Japan Electronics and Information Technology Industries Association).

In FIGS. 2 and 3, when the level of a communication signal is low, the switching devices Q10, Q11 and Q12 are turned off, on and off, respectively. In this case, a high level signal is supplied to the gate of the switching device Q1. As a result, the switching device Q1 is turned on and a load current I1 (100 mA in this example) flows through the light source A1 without flowing through the variable impedance circuit 2.

In FIGS. 2 and 3, when the level of a communication signal is high, the switching devices Q10, Q11 and Q12 are turned on, off and on, respectively. In this case, a low level signal is supplied to the gate of the switching device Q1. As a result, the switching device Q1 is turned off and a load current flows through the light source A1 via the variable impedance circuit 2. Thus, by performing ON and OFF control of the switching device Q1 in accordance with the communication signal, it is possible to modify a light intensity of the light source A1 to superpose the communication signal on an illumination light to be emitted from the light source A1.

When the level of the switching signal to the switching device Q2 is high, a load current I20 (80 mA in the example) flows through the light source A1 only through the resistor RX1. Therefore, the modulation rate in the case where the level of the switching signal is high is 0.2 (=(100−80)/100). On the other hand, when the level of the switching signal is low, a load current I21 (60 mA in the example) flows through the light source A1 through the resistors RX1 and RX2. Therefore, the modulation rate in the case where the level of the switching signal is low is 0.4 (=(100−60)/100). In the embodiment, by performing ON and OFF control of the switching device Q2 in accordance with a switching signal, it is possible to change an impedance of the variable impedance circuit 2 to change a load current, thereby changing the modulation rate. The modulation rate of the embodiment is a ratio of a difference between an ON-state current and OFF-state current to the ON-state current (a reduction ratio), wherein the ON-state current is the load current I1 when the switching device Q1 is turned on in accordance with the communication signal, and the OFF-state current is a load current I20 or I21 when the switching device Q1 is turned off in accordance with the communication signal.

In an example of FIG. 2 in the embodiment, the switching device Q2 is switched between ON and OFF while the switching device Q1 is turned on, thereby changing the impedance of the variable impedance circuit 2. While the switching device Q1 is turned on, no current flows through the variable impedance circuit 2. Therefore, a load current does not change before and after the impedance of the variable impedance circuit 2 is changed. As a result, the influence on the power supply 1 can be reduced. In the example of FIG. 2, while the switching device Q1 is turned on, the level of the switching signal is changed from high to low, and consequently a load current to flow while the switching device Q1 is turned off is switched from the load current I20 to the load current I21. Similarly, while the switching device Q1 is turned on, the level of the switching signal is changed from low to high, and consequently a load current to flow while the switching device Q1 is turned off is switched from the load current I21 to the load current I20.

Figure 4:
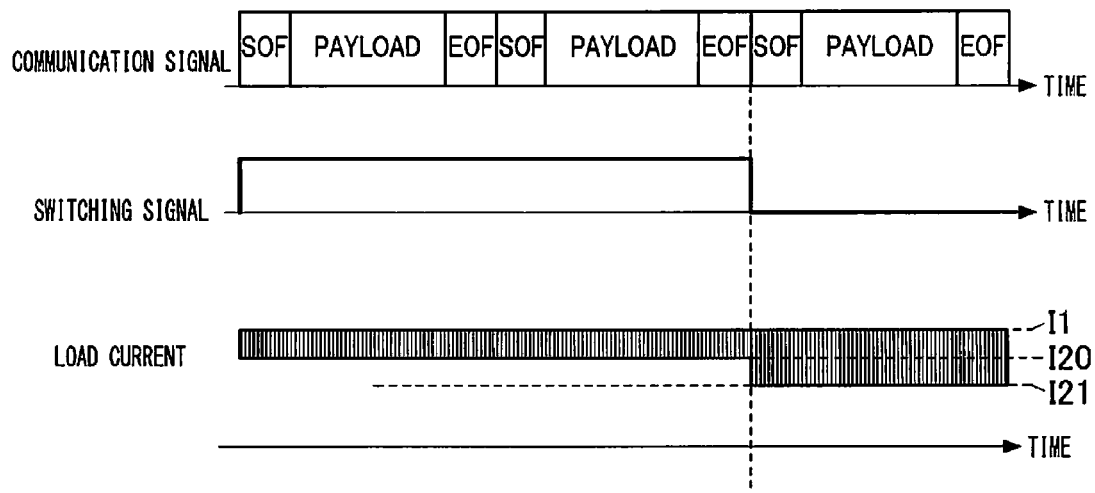
FIG. 4 is a timing diagram showing another operation example of a visible light communication in the embodiment 1.

As shown in an example of FIG. 4, the (second) switching device Q2 may be turned on or off at a timing corresponding to a boundary between neighboring frames of the communication signal. The communication signal contains frames (see CP-1222 of JEITA) such as, for example, 14 bit of "start of frame (SOF)", 512 bit of "actual data (PAYLOAD)", and 16 bit of "end-of-file (EOF)". That is, in the example of FIG. 4, the switching device Q2 is turned on or off at a timing corresponding to the termination of end-of-file between neighboring frames, namely EOF and SOF of the communication signal. In this configuration, the modulation rate is not changed within any frame of the communication signal. It is therefore possible to reduce a probability of a receive error of the communication signal at a receiver side.

In the embodiment, by changing the impedance of the variable impedance circuit 2 in accordance with a switching signal to the impedance-varying circuit, it is possible to easily change a load current flowing through the light source A1 in the case where a communication signal is superposed on an illumination light. Therefore, the modulation rate can be changed easily in the present embodiment. In the embodiment, the level of the switching signal can be changed by operating the console or the wireless terminal even just before lighting fixtures having light sources A1 are installed for example. It is therefore possible to adequately perform an environmental design of visible light communication without exchanging the impedance device 20 of the variable impedance circuit 2 even in the case where an illumination design is suddenly changed.

In the embodiment, a function of the first controller 3 and a function of the second controller 4 are realized by a common microcontroller as described above. That is, the first controller 3 and the second controller 4 share a common hardware in the embodiment. It is accordingly possible to reduce manufacturing cost in comparison with the case where the first controller 3 and the second controller 4 are formed of respective individual control circuits. As an example, the first controller 3 and the second controller 4 may be designed by respective individual logic circuits which are embedded in one IC.

In the embodiment, the switching device Q2 is switched between ON and OFF, thereby changing the impedance of the variable impedance circuit 2, but other methods may be employed for the visible light communication device. As an example of the methods, a load current may be changed by changing a gate-source voltage of the switching device Q2 to change a current bypassing the switching device Q2. In this method, it is possible to finely change the impedance of the variable impedance circuit 2.

The configuration of the variable impedance circuit 2 is not limited to the configuration of the present embodiment. For example, the variable impedance circuit 2 may be formed of a series circuit of resistors, a parallel circuit of resistors, or a combination circuit of the series circuit and the parallel circuit. The configuration of the switching device Q2 is also not limited to the configuration of the present embodiment. For example, switching devices Q2 may be individually connected in parallel with impedance devices and be each switched between ON and OFF. In this configuration, the modulation rate can be changed finely, because the impedance of the variable impedance circuit 2 can be changed in multiple stages.

Figure 5A:
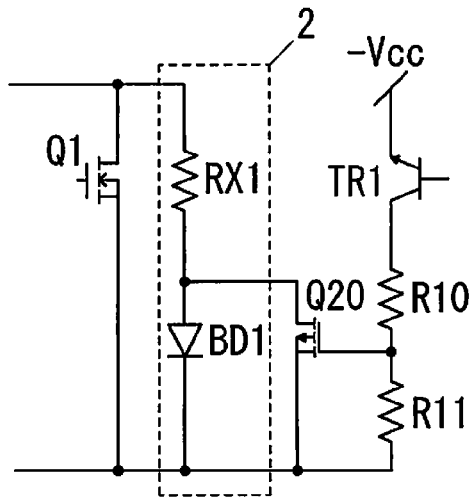
FIGS. 5A to 5C illustrate examples of a variable impedance circuit.
Figure 5B:
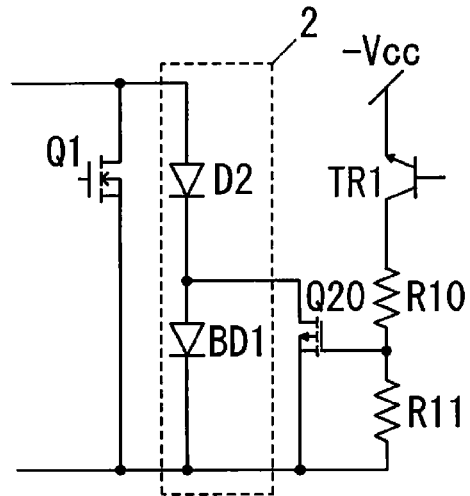

The impedance device is not limited to resistors. For example, in place of the resistors, a bipolar transistor may be employed as a variable resistor by controlling a base current thereof. Alternately, a body diode of a MOSFET may be employed as the impedance device of the variable impedance circuit 2. For example, as shown in FIG. 5A, the switching device Q2 may be replaced with a switching device Q20 formed of a p-channel MOSFET, thereby employing a body diode BD1 thereof in place of the resistor RX2. As shown in FIG. 5B, the resistor RX1 may be also replaced with a diode D2. Thus, by employing a diode(s) as the impedance device, a temperature correction is facilitated, because the light-emitting diodes LD1 constituting the light source A1 are a type of diode and the diode(s) as the impedance device has(have) a temperature characteristic similar to the light-emitting diodes.

In the configuration of this variable impedance circuit 2, a switching signal is supplied to a gate of the switching device Q20 via an inverting circuit configured to invert the switching signal. As shown in FIG. 5A, the inverting circuit is formed of an NPN transistor TR1 and a series circuit of resistors R10 and R11. The NPN transistor TR1 is configured so that a base and an emitter thereof receive the switching signal and a control voltage (−5V in the example), respectively. A collector of the NPN transistor TR1 is connected to the series circuit of resistors R10 and R11. A gate of the switching device Q20 is connected to a junction of the resistor R10 and the resistor R11.

In this configuration, if the level of the switching signal to the NPN transistor TR1 is high, a low level signal is supplied to the gate of the switching device Q20 and the switching device Q20 is turned on. If the level of the switching signal is low, a high level signal is supplied to the gate of the switching device Q20 and the switching device Q20 is turned off.

Figure 5C:
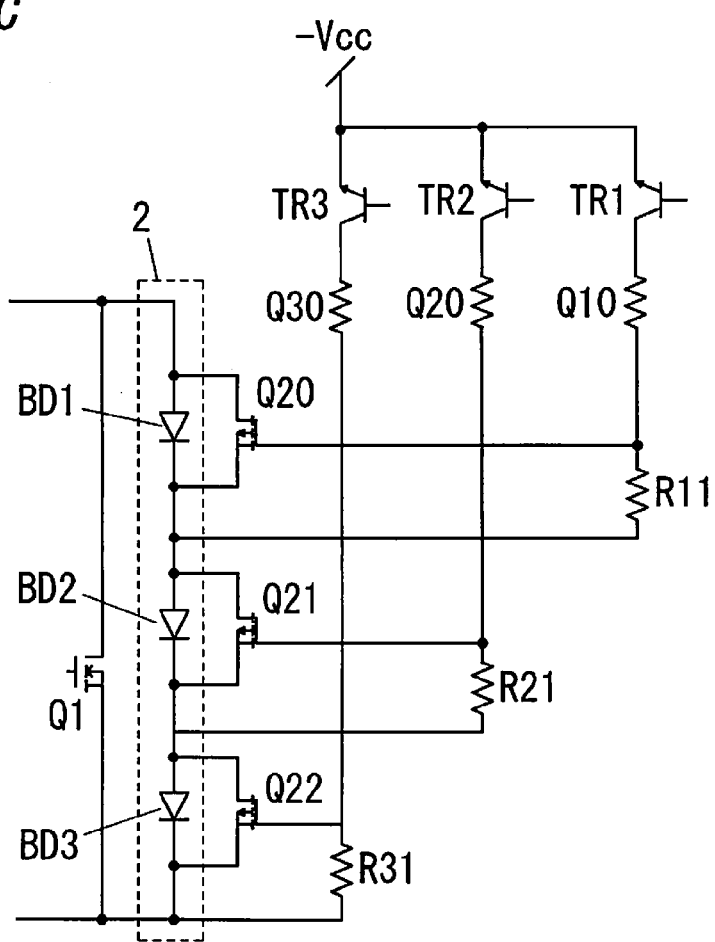

As an example, each component constituting the impedance device of the variable impedance circuit 2 may be formed of a body diode of a MOSFET. In an example of FIG. 5C, a series circuit of two or more (three in the figure) switching devices Q20-Q22 is connected in parallel with the switching device Q1. In this case, body diodes BD1-BD3 of the switching devices Q20-Q22, as impedance devices, constitute the variable impedance circuit 2.

Each of the switching devices Q21 and Q22 is configured so that its own gate receives the switching signal through an inverting circuit configured to invert the switching signal, in the same way as the switching device Q20. The inverting circuit connected to the switching device Q21 is formed of an NPN transistor TR2 and a series circuit of resistors R20 and R21. The inverting circuit connected to the switching device Q22 is formed of an NPN transistor TR3 and a series circuit of resistors R30 and R31. Each of the inverting circuits has the same configuration as the inverting circuit connected to the switching device Q20.

Switching signals supplied to the switching devices Q20-Q22 are different from each other. That is, the switching devices Q20-Q22 are configured to be each switched between ON and OFF individually. It is therefore possible to finely change the modulation rate in this configuration, because the impedance of the variable impedance circuit 2 can be changed in multiple stages.

In the configuration, the number of resistors causing an increase in size can be reduced and the impedance device can be embedded in an IC. As a result, a mounting area can be reduced.

(Embodiment 2)

Figure 6:
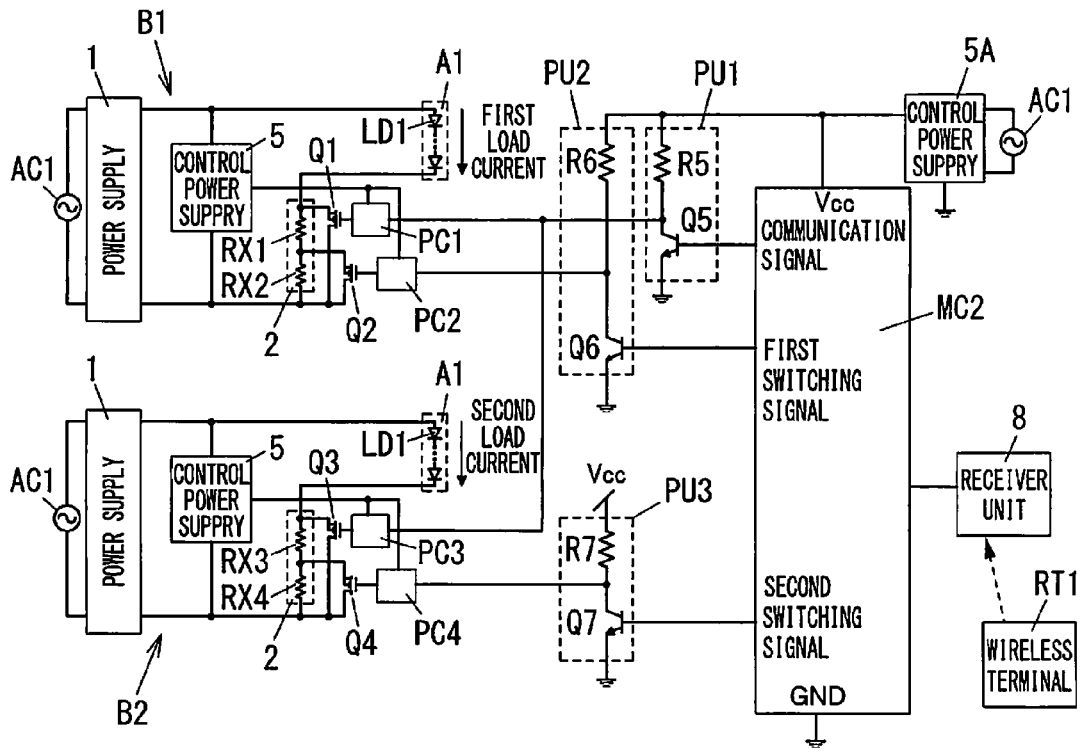
FIG. 6 is a schematic circuit diagram of a visible light communication device in accordance with an embodiment 2 of the present invention.
Figure 7:
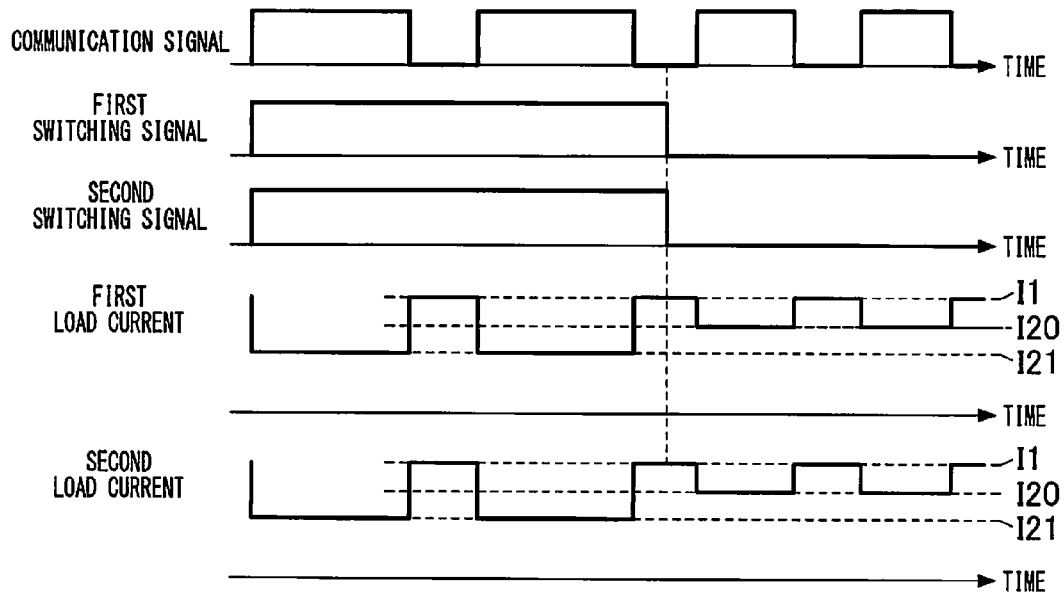
FIG. 7 is a timing diagram showing an example of a modulation operation in the embodiment 2.

Hereafter a visible light communication device in accordance with an embodiment 2 of the present invention is described with reference to figures. Like kind elements are assigned the same reference numerals as depicted in embodiment 1, and the detailed explanation is omitted. In the embodiment, as shown in FIGS. 6 and 7, a visible light communication is performed through two or more (two in the figures) light sources A1. The light sources A1 are individually connected with a first load unit B1 and a second load unit B2.

The first load unit B1 is formed of a variable impedance circuit 2, a control power supply 5, a switching device Q1 and a switching device Q2. The variable impedance circuit 2 is formed of a series circuit of resistors RX1 and RX2. The switching device Q1 is formed of an n-channel MOSFET and configured so that a gate of the n-channel MOSFET receives a communication signal via a photo-coupler PC1. The switching device Q2 is formed of an n-channel MOSFET and connected in parallel with the resistor RX2. The switching device Q2 is also configured so that a gate thereof receives a first switching signal as stated below through a photo-coupler PC2. The control power supply 5 is configured to supply a control voltage to the photo-couplers PC1 and PC2.

The second load unit B2 is formed of a variable impedance circuit 2, a control power supply 5, a switching device Q3 and a switching device Q4. The variable impedance circuit 2 of the second load unit B2 is formed of a series circuit of resistors RX3 and RX4. The switching device Q3 is formed of an n-channel MOSFET and configured so that a gate of the n-channel MOSFET receives a communication signal via a photo-coupler PC3. The switching device Q4 is formed of an n-channel MOSFET and connected in parallel with the resistor RX4. The switching device Q4 is also configured so that a gate thereof receives a second switching signal as stated below through a photo-coupler PC4. The control power supply 5 of the second load unit B2 is configured to supply a control voltage to the photo-couplers PC3 and PC4.

In the embodiment, a microcontroller MC2 is employed in place of the microcontroller MC1 and configured to perform a batch control of the load units B1 and B2. A control power supply 5A is configured to supply a control voltage to the microcontroller MC2. For example, the control power supply 5A is formed of an AC/DC converter and configured to convert a voltage supplied from a commercial power supply AC1 into a control voltage of 5V to output the control voltage.

The microcontroller MC2 realizes a function of a first controller 3 and a function of a second controller 4 by executing program stored therein. The microcontroller MC2 is configured to output a communication signal, the first switching signal for switching ON and OFF of the switching device Q2 in the first load unit B1, and the second switching signal for switching ON and OFF of the switching device Q4 in the second load unit B2.

The microcontroller MC2 is configured to supply the communication signal: to the switching device Q1 of the first load unit B1 via a pull-up circuit PU1 and the photo-coupler PC1; and to the switching device Q3 of the second load unit B2 via the pull-up circuit PU1 and the photo-coupler PC3. The microcontroller MC2 is also configured: to supply the first switching signal to the switching device Q2 of the first load unit B1 via a pull-up circuit PU2 and the photo-coupler PC2; and to supply the second switching signal to the switching device Q4 of the second load unit B2 via a pull-up circuit PU3 and the photo-coupler PC4.

The pull-up circuit PU1 is formed of a series circuit of a resistor R5 and an NPN transistor Q5 and configured to invert a communication signal to output the inverted communication signal. The pull-up circuit PU2 is formed of a series circuit of a resistor R6 and an NPN transistor Q6 and configured to invert a first switching signal to output the inverted first switching signal. The pull-up circuit PU3 is formed of a series circuit of a resistor R7 and an NPN transistor Q7 and configured to invert a second switching signal to output the inverted second switching signal.

The microcontroller MC2 is connected with a receiver unit 8 configured to receive a wireless signal transmitted from a wireless terminal RT1. The microcontroller MC2 is configured to change a level of the first switching signal or the second switching signal based on the wireless signal received through the receiver unit 8. In an example, the microcontroller MC2 may be connected with a console as an operation unit (not shown) and configured to change a level of the first switching signal or the second switching signal based on information obtained by operating the console.

Hereafter an operation of visible light communication in the embodiment is described with reference to FIGS. 6 and 7. When the level of a communication signal is low, a high level signal is supplied to the gates of the switching devices Q1 and Q3 in the load units B1 and B2. In this case, the switching devices Q1 and Q3 are turned on, and a load current I1 (100 mA in the embodiment) flows through each light source A1 in the load units B1 and B2 without flowing through the variable impedance circuit 2.

When the level of a communication signal is high, a low level signal is supplied to the gates of the switching devices Q1 and Q3 in the load units B1 and B2. In this case, the switching devices Q1 and Q3 are turned off, and a load current flows through the light source A1 of the load unit B1 via the variable impedance circuit 2 of the load unit B1, while a load current flows through the light source A1 of the load unit B2 via the variable impedance circuit 2 of the load unit B2. Thus, by performing ON and OFF control of the switching devices Q1 and Q3 in accordance with the communication signal, it is possible to modulate a light intensity of each light source A1 in the load units B1 and B2 to superpose the communication signal on an illumination light of each light source A1.

When the level of a first switching signal is high, the switching device Q2 of the first load unit B1 is turned off and a (first) load current I21 (60 mA in the embodiment) flows through the light source A1 connected to the first load unit B1 via the resistors RX1 and RX2. Therefore, the modulation rate in the case where the level of the first switching signal is high is 0.4 (=(100−60)/100). On the other hand, when the level of a first switching signal is low, the switching device Q2 of the first load unit B1 is turned on and a (first) load current I20 (80 mA in the embodiment) flows through the light source A1 of the first load unit B1 only via the resistor RX1. Therefore, the modulation rate in the case where the level of the first switching signal is low is 0.2 (=(100−80)/100).

When the level of a second switching signal is high, the switching device Q4 of the second load unit B2 is turned off and a (second) load current I21 (60 mA in the embodiment) flows through the light source A1 connected to the second load unit B2 via the resistors RX3 and RX4. Therefore, the modulation rate in the case where the level of the second switching signal is high is 0.4 (=(100−60)/100). On the other hand, when the level of a second switching signal is low, the switching device Q4 of the second load unit B2 is turned on and a (second) load current I20 (80 mA in the embodiment) flows through the light source A1 of the second load unit B2 only via the resistor RX3. Therefore, the modulation rate in the case where the level of the second switching signal is low is 0.2 (=(100−80)/100).

In the embodiment, even if two or more light sources A1 are provided, each modulation rate of the light sources A1 can be changed easily.

(Embodiment 3)

Figure 8:
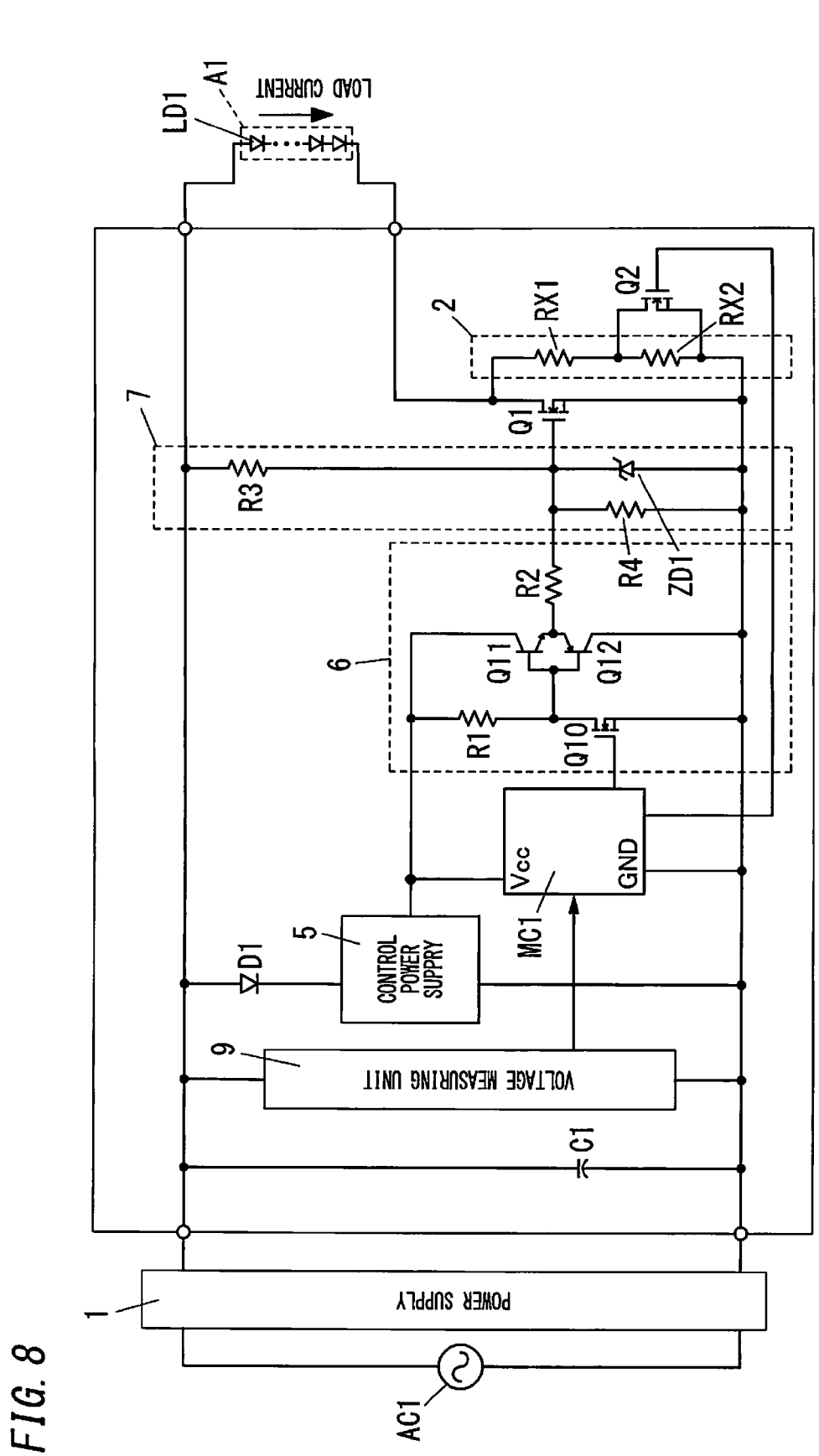
FIG. 8 is a schematic circuit diagram of a visible light communication device in accordance with an embodiment 3 of the present invention.

Hereafter a visible light communication device in accordance with an embodiment 3 of the present invention is described with reference to a figure. The present embodiment has a basic configuration similar to embodiment 1, and like kind elements are accordingly assigned the same reference numerals as depicted in embodiment 1, and the detailed explanation is omitted. As shown in FIG. 8, the present embodiment further includes a voltage measuring unit 9 configured to measure a voltage applied across a light source A1. A second controller 4 of the embodiment is configured to change an impedance of a variable impedance circuit 2 based on a measurement result obtained from the voltage measuring unit 9.

The voltage measuring unit 9 is formed of a series circuit of two or more resistors (not shown) for example and connected in parallel with a power supply 1. The voltage measuring unit 9 is configured to divide an output voltage of the power supply 1 into a divided voltage to supply the divided voltage to a microcontroller MC1. When a switching device Q1 is turned on, a voltage applied across the light source A1 is almost equal to the output voltage of the power supply 1. Therefore, the divided voltage obtained from the output voltage of the power supply 1 is proportional to a voltage applied across the light source A1.

For example, the second controller 4 is configured: to compare the voltage (value) measured through the voltage measuring unit 9 with a threshold (value) previously stored in the microcontroller MC1; and then to change the level of a switching signal to high if the voltage (value) exceeds the threshold (value) and also to change the level of the switching signal to low if the voltage (value) is less than the threshold (value). In the embodiment, it is therefore possible to automatically change the modulation rate to an appropriate rate in response to a voltage across the light source A1. For example, even if the light source (a first light source) A1 is replaced with a second light source A1 having light-emitting diodes LD1 which are connected in series with each other and different in quantity from those of the first light source A1, the modulation rate can be automatically changed to a rate suitable for the second light source A1.

(Embodiment 4)

Figure 9:
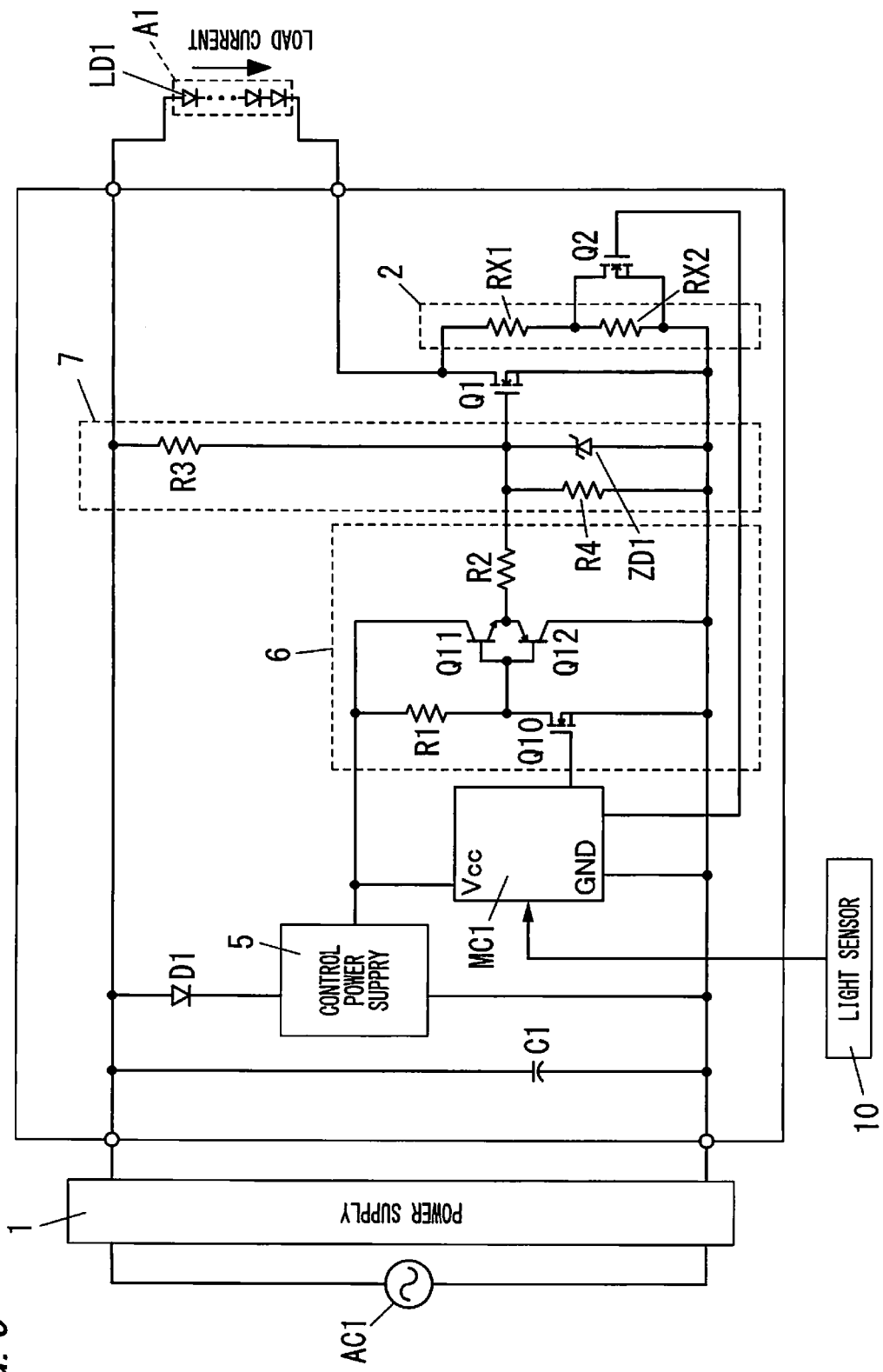
FIG. 9 is a schematic circuit diagram of a visible light communication device in accordance with an embodiment 4 of the present invention.

Hereafter a visible light communication device in accordance with an embodiment 4 of the present invention is described with reference to a figure. The present embodiment has a basic configuration similar to embodiment 1, and like kind elements are accordingly assigned the same reference numerals as depicted in embodiment 1, and the detailed explanation is omitted. As shown in FIG. 9, the present embodiment further includes a light sensor 10 configured to detect an ambient light. A second controller 4 of the embodiment is configured to change an impedance of a variable impedance circuit 2 based on a detection result obtained from the light sensor 10.

The light sensor 10 is formed of a photo-detector such as, for example, a known illuminance sensor or the like. The light sensor 10 is configured to supply a microcontroller MC1 with a signal which is proportional to illuminance of the ambient light received through the photo-detector. It is desirable that the light sensor 10 be installed at a position capable of detecting illuminance of an installation location of a light source A1.

For example, the second controller 4 is configured: to compare the illuminance (value) detected through the light sensor 10 with a threshold (value) previously stored in the microcontroller MC1; and then to change the level of a switching signal to low if the illuminance (value) exceeds the threshold (value) and also to change the level of the switching signal to high if the illuminance (value) is less than the threshold (value). In the embodiment, it is therefore possible to automatically change the modulation rate to an appropriate rate in response to an ambient light. For example, in a period of time or a place that a bright light strikes, a receiver performance of a receive-terminal can be improved by increasing the modulation rate.

(Embodiment 5)

In recent years, there is provided LED lighting fixtures of which LED light sources are classified into a replaceable type and a fixed type. Examples of the replaceable LED light sources include LED light bulbs, straight LED lamps, and the like. The replaceable LED light sources also include various light sources having different light intensity. In various LED light sources, a rated value of light source's power consumption is often employed as an index for showing the type of the light source. For example, three straight LED lamps with 13 W, 19 W and 22 W rated power have been provided as such various LED light sources. The greater wattage an LED light source has, the greater light intensity and the higher rated voltage (load voltage) the LED light source has.

In the visible light communication device of embodiment 3, the second controller 4 is configured to compare a voltage (a rated voltage) measured through the voltage measuring unit 9 with the threshold to change the modulation rate in response to the comparison result. Therefore, in order to change the modulation rate in response to the type of a straight LED lamp as the light source A1 of the three straight LED lamps, the modulation rate corresponding the type of the straight LED lamp can be selected by comparing a voltage (value) measured through the voltage measuring unit 9 with first, second and third thresholds Vth1, Vth2 and Vth3 (see FIG. 11B). In an example of FIG. 11B, the second threshold Vth2 is larger than the first threshold Vth1, and the third threshold Vth3 is larger than the second threshold Vth2.

Figure 11A:
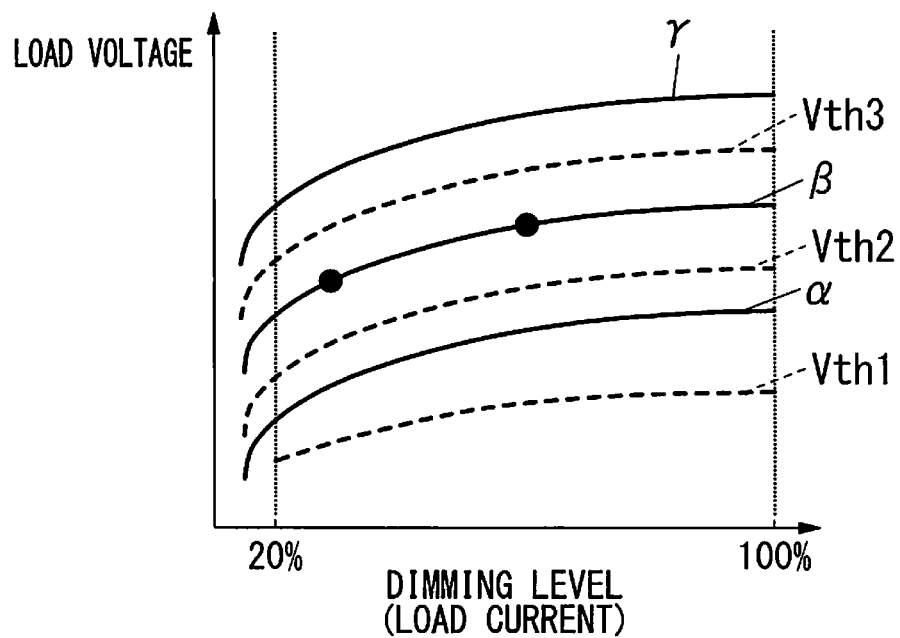
FIGS. 11A and 11B are graphs showing a relation between a load current (a dimming level) and a load voltage.
Figure 11B:
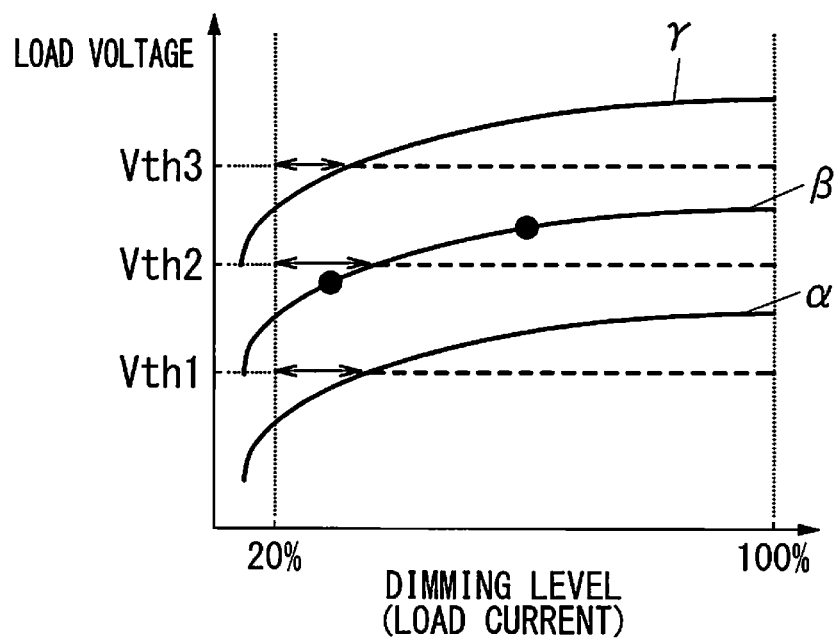

However, in the case where the lighting fixture is of dimmer type, as a dimming level is lower, a voltage applied across the light source A1 more decreases, where the dimming level is a ratio of light quantity (a ratio of current), and a ratio of light quantity is, for example, 100% in the case of a rated power (see FIG. 11B). In FIG. 11B, three solid lines α, β and γ show a relation between a dimming level (a load current) and a load voltage of the three straight LED lamps with 13 W, 19 W and 22 W rated power, respectively.

For example, when the straight LED lamp with 19 W rated power is employed as the light source A1, the load voltage of 100% dimming level is larger than the threshold Vth2 and less than the threshold Vth3. It is therefore possible to correctly judge that the light source A1 is the straight LED lamp with 19 W rated power (see solid line β).

However, if the dimming level decreases to approach a lower limit (20%), the load voltage becomes less than the threshold Vth2. That is, the load voltage is larger than the threshold Vth1 and less than the threshold Vth2, and the light source A1 is accordingly misjudged to be the straight LED lamp with 13 W rated power.

As shown in FIG. 11A, the visible light communication device of the present embodiment is configured to have thresholds Vth1, Vth2 and Vth3 varying with load voltage fluctuation in response to a dimming level in order to correctly judge the type of a straight LED lamp as the light source A1. A rated power of an LED light source depends on the number of LED chips constituting the LED light source. Therefore, the three straight LED lamps with 13 W, 19 W and 22 W rated power have a common rated load current.

Hereafter a visible light communication device in accordance with an embodiment 5 of the present invention is described with reference to a figure. The present embodiment has a basic configuration similar to embodiment 3, and like kind elements are accordingly assigned the same reference numerals as depicted in embodiment 3, and the detailed explanation is omitted.

Figure 10:
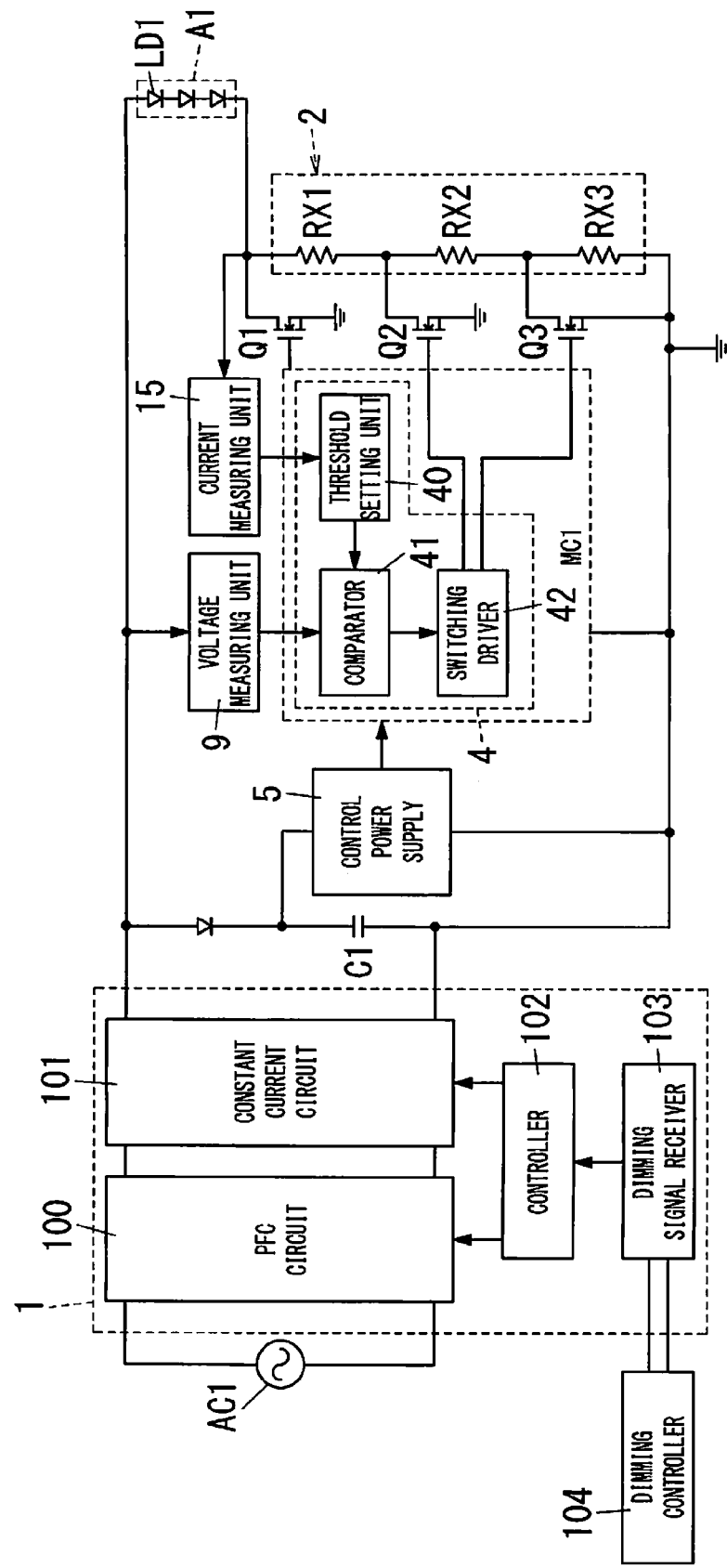
FIG. 10 is a schematic circuit diagram of a visible light communication device in accordance with an embodiment 5 of the present invention.

As shown in FIG. 10, a power supply 1 is a switching power supply formed of a power factor correction (PFC) circuit 100, a constant current circuit 101, a controller 102 for controlling the circuits 100 and 101, a dimming signal receiver 103 and the like. The constant current circuit 101 is formed of, for example, a DC/DC converter such as a step-down chopper circuit or the like. The dimming signal receiver 103 is configured to receive a dimming signal supplied from an external dimming controller 104 to supply the controller 102 with a dimming level derived from the received dimming signal. The controller 102 is configured to control the constant current circuit 101 so that a load current to flow through the light source A1 agrees with a current corresponding to the dimming level from the dimming signal receiver 103. That is, an output voltage (a load voltage) and an output current (a load current) of the power supply 1 becomes a maximum when the dimming level is 100% (a rated power) and decreases as the dimming level decreases. When LED light sources (e.g., three straight LED lamps with 13 W, 19 W and 22 W rated power) are formed of homogeneous devices (LED chips), load currents flowing through the LED light sources have the same value, while load voltages of the LED light sources have different values corresponding to their rated power (see FIG. 11A). It is accordingly possible to constantly judge the type of an LED light source as the light source A1 to select an appropriate modulation rate regardless of a dimming level by setting the thresholds Vth1, Vth2 and Vth3 to be compared with a load voltage to values responding to a load current (e.g., values varying with a load current).

The visible light communication device of the present embodiment includes a voltage measuring unit 9 configured to measure a load voltage applied across the light source A1 from the power supply 1, and a current measuring unit 15 configured to measure a load current flowing through the light source A1.

A second controller 4 of the embodiment includes a threshold setting unit 40, a comparator 41 and a switching driver 42. The threshold setting unit 40 is configured to set the thresholds Vth1, Vth2 and Vth3 to be compared with a load voltage to values responding to values (load current values) measured through the current measuring unit 15. Specifically, the threshold setting unit 40 is configured to set a threshold to be compared with a load voltage of an LED light source to a variable value varying with a load current (value) of the LED light source, where the variable value is set to a variable value lower than the load current in all a variable range of a load current (e.g., 20% to 100%). For example, as shown in FIG. 11A, the threshold setting unit 40 is configured to set a threshold to be compared with a load voltage of a first LED light source (the straight LED lamp with 13 W rated power) to a variable value Vth1 varying with a load current α of the first LED light source, where the variable value Vth1 is set to a variable value lower than the load voltage in all a variable range of the load current α. The threshold setting unit 40 is configured to set a threshold to be compared with a load voltage of a second LED light source (the straight LED lamp with 19 W rated power) to a variable value Vth2 varying with a load current β of the second LED light source, where the variable value Vth2 is set to a variable value lower than the load voltage in all a variable range of the load current β. The threshold setting unit 40 is configured to set a threshold to be compared with a load voltage of a third LED light source (the straight LED lamp with 22 W rated power) to a variable value Vth3 varying with a load current γ of the third LED light source, where the variable value Vth3 is set to a variable value lower than the load current in all a variable range of the load current γ. The comparator 41 is configured to compare a value (a load voltage value) measured through the voltage measuring unit 9 with the thresholds Vth1, Vth2 and Vth3 set through the threshold setting unit 40 to supply a comparison result to the switching driver 42. The switching driver 42 is configured to perform ON and OFF control of two switching devices Q2 and Q3 in accordance with the comparison result from the comparator 41.

As shown in FIG. 10, a variable impedance circuit 2 of the present embodiment is formed of a series circuit of three resistors RX1, RX2 and RX3. The resistors RX1, RX2 and RX3 are connected with a switching device Q1, the switching device Q2 and the switching device Q3, respectively. Specifically, the switching device Q1 is connected in parallel with the series circuit of resistors RX1, RX2 and RX3. The switching device Q2 is connected in parallel with a series circuit of resistors RX2 and RX3. The switching device Q3 is connected in parallel with the resistor RX3. Therefore, the lowest modulation rate is set when both of the switching devices Q2 and Q3 are turned on, while the highest modulation rate is set when both of the switching devices Q2 and Q3 are turned off. The modulation rate becomes an intermediate value when one of the switching devices Q2 and Q3 is turned off and the other is turned on.

Figure 12:
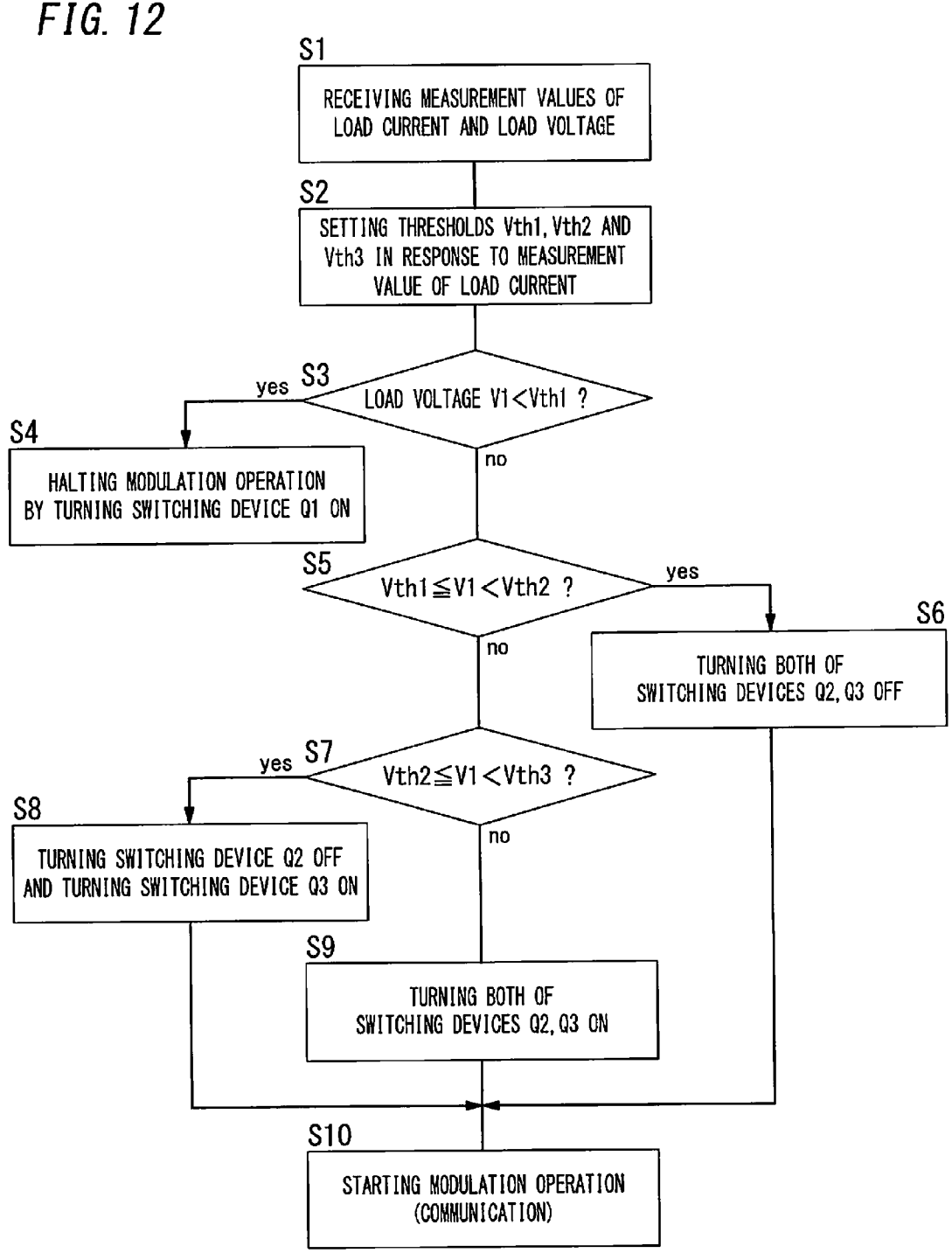
FIG. 12 is a flow chart illustrating an operation in the embodiment 5.

Hereafter an operation of the second controller 4 in the embodiment is described with reference to a characteristic diagram of dimming level (load current) and load voltage of FIG. 11A and a flow chart of FIG. 12. In FIG. 11A, three solid lines α, β and γ show a relation between a dimming level (a load current) and a load voltage of the three straight LED lamps with 13 W, 19 W and 22 W rated power, respectively.

If a visible light communication device of the embodiment is powered on, a microcontroller MC1 is activated and initiates the process for setting the thresholds Vth1, Vth2 and Vth3 to values corresponding to types for the light source A1. The comparator 41 of the second controller 4 receives a measurement value V1 of a load voltage from the voltage measuring unit 9, and the threshold setting unit 40 receives a measurement value of a load current from the current measuring unit 15 (step S1 of FIG. 12).

The threshold setting unit 40 reads out the thresholds Vth1, Vth2 and Vth3 corresponding to the measurement value of the load current from a data table stored in a memory of the microcontroller MC1, and sets the thresholds Vth1, Vth2 and Vth3 to the comparator 41 (step S2). For example, the data table includes thresholds Vth1, Vth2 and Vth3 assigned to each of sections obtained by dividing a load current by several percentages. The threshold setting unit 40 is configured to read out the thresholds Vth1, Vth2 and Vth3 assigned to a section corresponding to the measurement value of the load current.

The comparator 41 compares the measurement value V1 of the load voltage from the voltage measuring unit 9 with a minimum threshold Vth1 of the thresholds Vth1, Vth2 and Vth3 set by the threshold setting unit 40 (step S3). When the measurement value V1 of the load voltage is less than the threshold Vth1, there is a possibility that a malfunction occurs in the light source A1. In this case, the switching driver 42 turns the switching device Q1 on to maintain the ON state, thereby halting the modulation operation (step S4).

When the measurement value V1 of the load voltage is equal to or greater than the threshold Vth1, the comparator 41 compares the measurement value V1 of the load voltage with the intermediate threshold Vth2 (step S5). When the measurement value V1 of the load voltage is less than the threshold Vth2, the light source A1 is estimated to be the straight LED lamp with 13 W rated power. In this case, the switching driver 42 turns the switching devices Q2 and Q3 off, thereby setting the modulation rate to the highest value (step S6).

When the measurement value V1 of the load voltage is equal to or greater than the threshold Vth2, the comparator 41 compares the measurement value V1 of the load voltage with the maximum threshold Vth3 (step S7). When the measurement value V1 of the load voltage is less than the threshold Vth3, the light source A1 is estimated to be the straight LED lamp with 19 W rated power. In this case, the switching driver 42 turns the switching device Q2 off and also turns the switching device Q3 on, thereby setting the modulation rate to the intermediate value (step S8).

When the measurement value V1 of the load voltage is equal to or greater than the threshold Vth3, the light source A1 is estimated to be the straight LED lamp with 22 W rated power. In this case, the switching driver 42 turns the switching devices Q2 and Q3 on, thereby setting the modulation rate to the lowest value (step S9).

If the switching driver 42 finishes switching control of the switching devices Q2 and Q3, a first controller 3 controls the switching device Q1 to start an modulation operation (a communication) (step S10).

As mentioned above, the visible light communication device of the embodiment includes a voltage measuring unit 9 configured to measure a voltage (a load voltage) applied across the light source A1, and a current measuring unit 15 configured to measure a current (a load current) flowing through the light source A1. The second controller 4 is configured to change the impedance of the variable impedance circuit 2 based on a comparison result between one or more thresholds Vth1, Vth2 and Vth3 corresponding to a measurement value by the current measuring unit 15 and a measurement value V1 by the voltage measuring unit 9.

Therefore, the visible light communication device of the embodiment changes the thresholds Vth1, Vth2 and Vth3 for judging the type of the light source A1 in response to a load voltage varying with a dimming level. As a result, it is possible to prevent misjudgment and also to set an appropriate modulation rate in accordance with a type of the light source A1.

Examples of methods for dimming an LED light source include the aforementioned method for changing a magnitude of a load current (a DC dimming method), and a method for activating and deactivating an LED light source periodically, thereby changing a ratio of activation time period (an ON duty ratio) (a burst dimming method). In the case where a dimming method for the power supply 1 is the burst dimming method, it is preferable that the voltage measuring unit 9 and the current measuring unit 15 measure not an instantaneous value but a mean value during a period of time similar to a burst time cycle.

(Embodiment 6)

Figure 13:
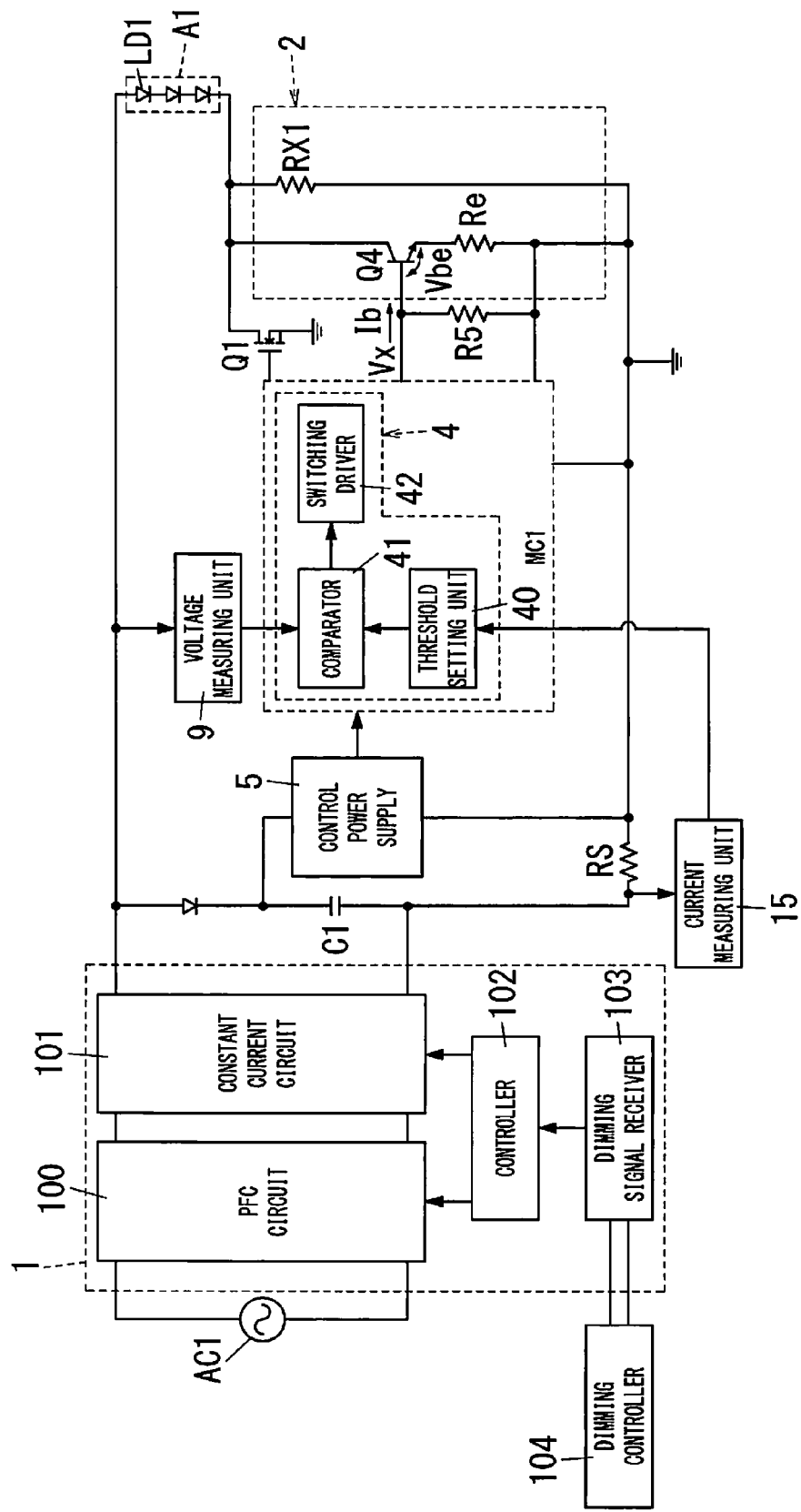
FIG. 13 is a schematic circuit diagram of a visible light communication device in accordance with an embodiment 6 of the present invention.

Hereafter a visible light communication device in accordance with an embodiment 6 of the present invention is described with reference to a figure. The present embodiment has a basic configuration similar to embodiment 5, and like kind elements are accordingly assigned the same reference numerals as depicted in embodiment 5, and the detailed explanation is omitted. As shown in FIG. 13, a current measuring unit 15 of the present embodiment is configured to measure a load current from a voltage drop across a detection resistor RS intervening between a low voltage side of a smoothing capacitor C1 and a low voltage side of a light source A1.

In the case where the variable impedance circuit 2 is formed of the resistors and the switching devices like embodiment 5, it is required that resistors having resistance values corresponding to types of LED light sources employed as the light source A1 are combined. In the case where the visible light communication device is applied to many LED light sources which are formed of homogeneous devices (LED chips) and have different rated power, many variable impedance circuits 2 formed of combinations of resistors having various resistance values are required in order to conform to types of the LED light sources. This causes a problem of a rise in management cost such as production costs and store expense of visible light communication devices.

Therefore, in the embodiment, a variable impedance circuit 2 includes an NPN bipolar transistor (hereinafter simply called a "transistor") Q4 as a variable resistor. In an example of FIG. 13, the variable impedance circuit 2 is formed of a resistor RX1, the transistor Q4 and an emitter resistor Re. The variable impedance circuit 2 may further include a resistor R5.

The resistor RX1 is connected between a junction of a switching device Q1 and the light source A1 and Ground. A collector of the transistor Q4 is connected to the junction of the switching device Q1 and the light source A1, and an emitter of the transistor Q4 is connected to Ground via the emitter resistor Re. A base of the transistor Q4 is connected to Ground via the resistor R5. If a drive voltage Vx is output from a switching driver 42 of a second controller 4, the drive voltage Vx is applied to the base of the transistor Q4.

A base current Ib (=(Vx−Vbe)/Re) is supplied to the base of the transistor Q4 from the switching driver 42, where "Vbe" is a base-emitter voltage of the transistor Q4 and "Re" is a resistance value of the emitter resistor Re. A corrector current Ic (=hFE×Ib) flows through the transistor Q4, where "hFE" is a DC current amplification factor.

That is, the base current Ib increases as the drive voltage Vx increases. The collector current Ic increases as the base current Ib increases. Here, the transistor Q4 is regarded as a variable resistor. In this case, when the drive voltage Vx increases, the resistance value of the variable resistor decreases and a current (the collector current Ic) increases. The resistance value of the variable resistor increases and the current decreases when the drive voltage Vx decreases.

Thus, the switching driver 42 changes the drive voltage Vx, thereby increasing and decreasing the load current when the switching device Q1 is turned off. As a result, the modulation rate can be adjusted. The resistance temperature characteristic of a bipolar transistor (the temperature characteristic of base-emitter voltage and collector current) has higher temperature dependability than the resistance temperature characteristic of a resistor. It is therefore preferable that the switching driver 42 measure a temperature (or an ambient temperature) of the variable impedance circuit 2 with a temperature sensor such as a thermistor or the like to correct the drive voltage Vx in response to a temperature measurement result (the measured temperature).

As described above, in the embodiment, the variable impedance circuit 2 includes the bipolar transistor Q4. It is therefore possible to conform to types of various LED light sources and reduce management cost by changing the program for realizing the switching driver 42 without many variable impedance circuits 2 formed of combinations of resistors having various resistance values.

The invention claimed is:

1. A visible light communication device, comprising:
    a variable impedance circuit which has an impedance device and is connected in series with a light source comprising a light-emitting device;
    a switch circuit which is connected in parallel with the variable impedance circuit and is configured to switch whether to connect the variable impedance circuit to the light source or not;
    a first controller which is configured to perform ON and OFF control of the switch circuit and thereby to modulate an intensity of an illumination light emitted from the light source to superpose a binary communication signal on the illumination light;
    an impedance-varying circuit which is connected with the variable impedance circuit and configured to change an impedance of the variable impedance circuit; and
    a second controller which is configured to control the impedance-varying circuit to change the impedance of the variable impedance circuit,
    wherein the first and second controllers share a common hardware.

2. The visible light communication device of claim 1, further comprising a voltage measuring unit configured to measure a voltage applied across the light source,
    wherein the second controller is configured to change the impedance of the variable impedance circuit based on a measurement result by the voltage measuring unit.

3. The visible light communication device of claim 1, further comprising a voltage measuring unit configured to measure a voltage applied across the light source and a current measuring unit configured to measure a current flowing through the light source,
    wherein the second controller is configured to change the impedance of the variable impedance circuit based on a comparison result between one or more thresholds corresponding to a measurement result by the current measuring unit and a measurement result by the voltage measuring unit.

4. The visible light communication device of claim 1, further comprising a light sensor configured to detect an ambient light,
    wherein the second controller is configured to change the impedance of the variable impedance circuit based on a detection result by the light sensor.

5. The visible light communication device of claim 1, wherein the impedance device is formed of a body diode of a MOSFET.

6. The visible light communication device of claim 2, wherein the impedance device is formed of a body diode of a MOSFET.

7. The visible light communication device of claim 4, wherein the impedance device is formed of a body diode of a MOSFET.

8. The visable light communication device of claim 3, wherein the impedance device is formed of a body diode of a MOSFET.

\* \* \* \* \*